United States Patent Office.

WILLIAM HORWITZ, OF NEW YORK, N. Y.

Letters Patent No. 109,010, dated November 8, 1870; antedated October 28, 1870.

IMPROVEMENT IN LIQUID GLUE.

The Schedule referred to in these Letters Patent and making part of the same.

To all whom it may concern:

Be it known that I, WILLIAM HORWITZ, M. D., of the city, county, and State of New York, have invented a new and improved Composition for Liquid Glue; and I do hereby declare that the following is a full, clear, and exact description thereof, which will enable others skilled in the art to make and use the same.

This invention relates to a new composition for a liquid adhesive material, which is not liable to ferment or congeal when prepared, and which will be insoluble in water after application.

The ingredients employed by me in the manufacture of my improved liquid glue, are:

Alum, isinglass, alcohol, gelatine, shellac, and vinegar.

The first four are in the relative proportions of 1-2-8-32, while enough boiling vinegar is used to dissolve the gelatine and isinglass. A solution of these three last-mentioned ingredients being thus obtained, it is carefully strained to obtain what constitutes the agglutinant or adhesive quality, when the alcohol and alum are added with a small quantity of dissolved shellac.

The alcohol prevents the liquid from any tendency to mold when kept for a considerable length of time.

The alum gives the composition the quality of imperviousness to water, and defends all the ingredients from being attacked by moisture.

The shellac gives color and body to the mixture, and is useful, but not indispensible or relatively so important.

The liquid glue thus prepared will, when properly corked or protected from the air, remain in proper state for immediate use, and, when applied, it will constitute an excellent adhesive substance which can be used for all purposes to which glue is now applied.

Having thus described my invention,

I claim as new and desire to secure by Letters Patent—

The herein-described composition for liquid glue, consisting of the ingredients substantially in the proportions herein set forth.

WILLIAM HORWITZ, M. D

Witnesses:
A. V. BRIESEN,
GEO. W. MABEE.